United States Patent [19]
Maes

[11] 4,102,129
[45] Jul. 25, 1978

[54] CONTROL APPARATUS
[75] Inventor: Richard J. Maes, Decatur, Ill.
[73] Assignee: Caterpillar Tractor Co., Peoria, Ill.
[21] Appl. No.: 812,094
[22] Filed: Jul. 1, 1977
[51] Int. Cl.² .............................................. F15B 20/00
[52] U.S. Cl. ........................................ 60/403; 60/405
[58] Field of Search ..................... 60/403, 404, 405; 180/82 R

[56] References Cited
U.S. PATENT DOCUMENTS

| | | | |
|---|---|---|---|
| 2,954,671 | 10/1960 | Kress | 60/405 |
| 3,921,748 | 11/1975 | Dunn | 60/405 |
| 3,940,931 | 3/1976 | Renfro et al. | 60/403 |

*Primary Examiner*—Edgar W. Geoghegan
*Attorney, Agent, or Firm*—John L. James

[57] ABSTRACT

Control apparatus is provided for an apparatus which has first and second mechanisms. The control apparatus automatically, controllably energizes the second mechanism in response to a preselected condition of the first mechanism and selectively, controllably energizes the second mechanism independently of the condition of the first mechanism.

6 Claims, 1 Drawing Figure

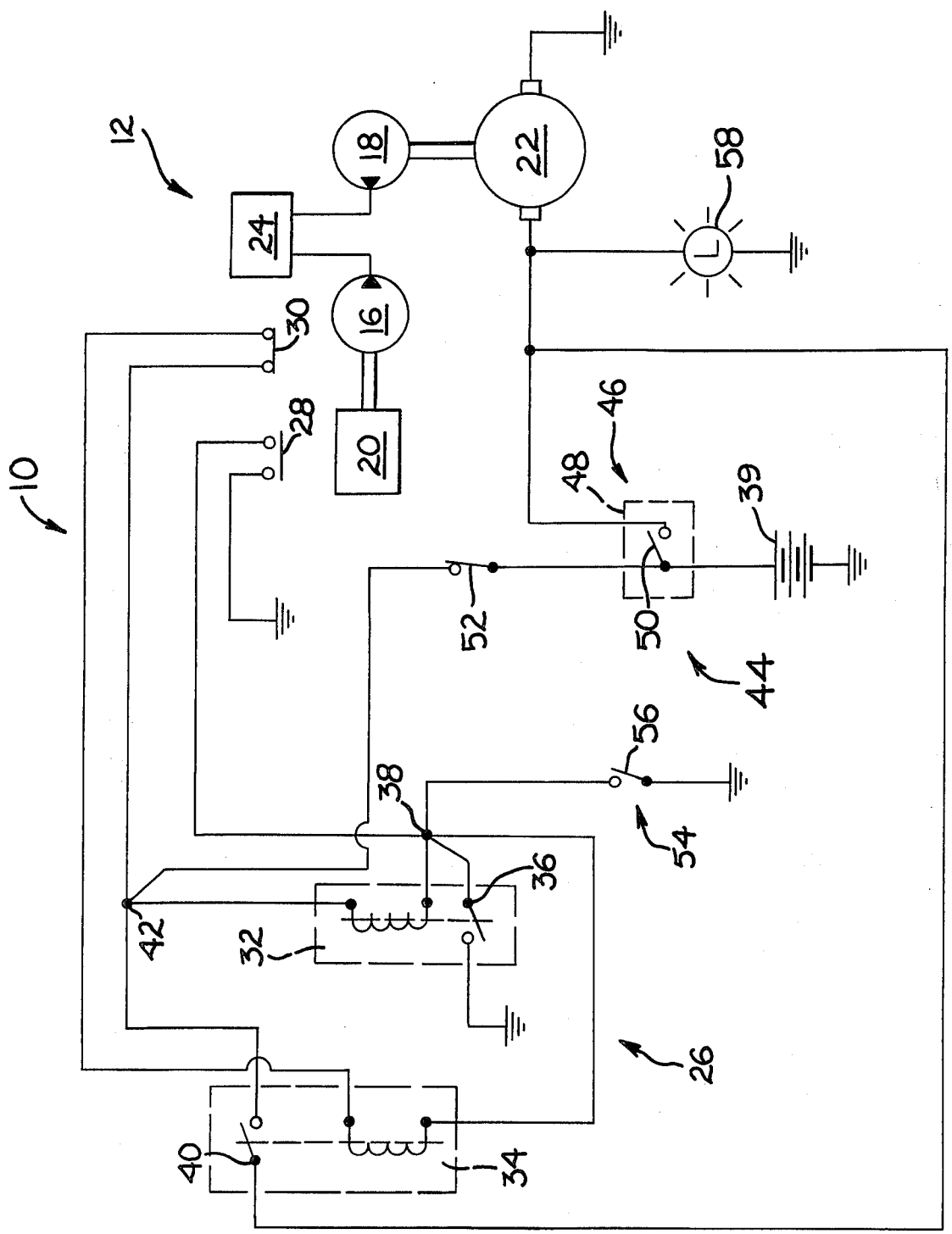

CONTROL APPARATUS

BACKGROUND OF THE INVENTION

Current vehicles, especially trucks, are often equipped with fluid actuated steering systems. The steering system often includes a primary pump and a secondary, emergency steering pump. The secondary pump is usually manually placed in service upon failure of the primary pump. It is desirable to have a control system which automatically provides emergency steering and which can be manually controlled at any given time.

SUMMARY OF THE INVENTION

The present invention is directed to overcoming one or more of the problems as set forth above.

According to the present invention, control apparatus is provided for an apparatus which has first and second mechanisms. The control apparatus includes first means for automatically, controllably energizing the second mechanism in response to a preselected condition of the first mechanism and second means for selectively, controllably energizing the second mechanism independently of the first means and of the condition of the first mechanism.

BRIEF DESCRIPTION OF THE DRAWING

The drawing is a schematic illustration of the control apparatus of the present invention.

DETAILED DESCRIPTION

Referring to the drawing, control apparatus 10 is provided for an apparatus, such as a fluid actuated steering system 12 for example, which has first and second mechanisms, such as engine and motor driven pumps 16, 18 for example. The pumps 16, 18 are driven by an engine and motor 20, 22, respectively, and deliver fluid to a steering control valve 24.

The control apparatus 10 includes first means 26 for automatically, controllably energizing the motor driven pump 18 in response to a preselected condition of the engine 20 and engine driven pump 16. The first means 26 includes means for detecting the preselected condition, preferably an oil pressure switch 28 and an oil flow switch 30. The oil pressure switch 28 is normally open and preferably closes in response to engine oil pressure exceeding a preselected value. The oil flow switch 30 is normally closed and preferably opens in response to oil flow from the engine pump 16 exceeding a preselected value.

The first means 26 also includes first and second relays 32, 34 which are connected to the oil pressure and flow switches 28, 30 and to the motor 22. The first relay 32 is preferably a latching relay which latches through its normally open contacts 36. The first relay 32, the contacts 36, the oil pressure switch 28, and the second relay 34 are connected at junction 38. The contacts 36 and the oil pressure switch 28 are connected through the relay 32 to a power source 39.

The second relay 34 is connected to one side of the oil flow switch 30. The other side of the oil flow switch 30 is connected to the first relay 32 and contacts 40 of the second relay 34 at junction 42. The contacts 40 are also connected to the motor 22 and are of a construction sufficient for carrying current to energize the motor 22.

The control apparatus 10 includes second means 44 for selectively, controllably energizing the motor driven pump 18 independently of the first means 26 and independently of the condition of the engine 20 and engine driven pump 16 and for controllably energizing the motor driven pump 18 in response to the preselected condition of the engine 20 and pump 16. The second means 44 includes connecting means 46 for connecting the power source 39 to the motor 22 and first means 26 and maintaining the connection. The connecting means 46 includes a transfer switch 48.

The transfer switch 48 preferably has a contactor 50 movable between a first position at which the power source 39 is only connected to the first means 26 and a second position at which the power source 39 is connected to the motor 22. The power source 39 is always connected to the motor 22, or first means 26 or both the motor 22 and first means 26. The switch 48 is of a construction sufficient for carrying current to energize the motor 22.

A reset switch 52 or other control device such as a circuit breaker is connected to the first means 26 and the transfer switch 48 to de-energize and reset the control apparatus 10.

The control apparatus 10 includes means 54 for testing the first and second means 26, 44. The testing means 54 includes a test switch 56 connected to the power source 39 and the first means 26 at the junction 38. An indicating lamp 58 is connected in parallel with the motor 22. The test switch 56 is movable between an open position at which the lamp 58 is de-energized and a closed position at which the lamp is energized through the first means 26. The lamp 58 is also energized when the transfer switch 48 is in the second position.

In operation, oil pressure in the engine 20 closes the oil pressure switch 28 and the first relay 32 energizes and latches when the transfer switch 48 is in the first position. At the same time oil flow in the pump 16 opens the flow switch 30. A subsequent drop in oil pressure has no effect, but a drop in flow will close the flow switch 30 and energize the second relay 34 which energizes the motor 22. The motor 22 operates the pump 18 which pumps fluid to the control valve 24 and the steering system 12. The control apparatus 10 is prepared for another operation by momentarily opening the reset switch 52 to allow the first relay 32 to unlatch.

The first means 26 is overridden by moving the transfer switch 48 to the second position which energizes the motor 22 and pump 18.

Thus, the control apparatus automatically provides emergency steering and can be manually controlled at any given time.

Other aspects, objects and advantages will become apparent from a study of the specification, drawings and appended claims.

The embodiments of the invention in which an exclusive property or privilege is claimed are defined as follows:

1. Control apparatus for an apparatus having first and second mechanisms, comprising:
    first means for automatically, controllably energizing said second mechanism in response to a preselected condition of said first mechanism; and
    second means for selectively, controllably energizing said second mechanism independently of said first means and independently of the condition of said first mechanism and for controllably energizing said second mechanism in response to the preselected condition of said first mechanism.

2. An apparatus, as set forth in claim 1, wherein said second means includes means for connecting a power source to said second mechanism and said first means and maintaining said connection.

3. An apparatus, as set forth in claim 2, wherein said connecting means includes a switch having a contactor, said contactor being movable between a first position at which said power source is only connected to said first means and a second position at which said power source is connected to said second mechanism.

4. An apparatus, as set forth in claim 3, wherein said power source is connected to said first means, while said contactor is moving between the first and second positions.

5. An apparatus, as set forth in claim 2, including means for testing said first and second means, said testing means including an indicating lamp connected to said second mechanism in parallel.

6. An apparatus, as set forth in claim 5, wherein said testing means includes a test switch connected to said first means and movable between an open position at which the indicating lamp is de-energized and a closed position at which said indicating lamp is energized.

* * * * *